US008793387B2

(12) United States Patent
Dumitru et al.

(10) Patent No.: US 8,793,387 B2
(45) Date of Patent: *Jul. 29, 2014

(54) METHOD FOR PRE-FETCHING DATA CHUNKS OF AN EMAIL ATTACHMENT ON A PORTABLE ELECTRONIC DEVICE

(75) Inventors: Dan Dumitru, Atlanta, GA (US); Rakesh Arora, Burlington (CA); Eshwar Stalin, Atlanta, GA (US)

(73) Assignee: BlackBerry Limited, Waterloo (CA)

( * ) Notice: Subject to any disclaimer, the term of this patent is extended or adjusted under 35 U.S.C. 154(b) by 249 days.

This patent is subject to a terminal disclaimer.

(21) Appl. No.: 13/401,700

(22) Filed: Feb. 21, 2012

(65) Prior Publication Data

US 2012/0166595 A1    Jun. 28, 2012

Related U.S. Application Data

(63) Continuation of application No. 11/835,595, filed on Aug. 8, 2007, now Pat. No. 8,145,766.

(51) Int. Cl.
*G06F 15/16* (2006.01)

(52) U.S. Cl.
USPC .......................................................... 709/227

(58) Field of Classification Search
CPC .............. H04L 29/08072; H04L 29/06; H04L 29/0809; H04L 29/08117; H04L 29/08108; H04L 29/0881; H04L 29/08828; G06Q 30/02
USPC .......... 709/207, 217–219; 715/209, 203, 255, 715/256, 251, 748, 752
See application file for complete search history.

(56) References Cited

U.S. PATENT DOCUMENTS

| 5,845,074 | A  | 12/1998 | Kobata |
| 6,023,726 | A  | 2/2000 | Saksena |
| 6,275,850 | B1 | 8/2001 | Beyda et al. |
| 6,370,163 | B1 | 4/2002 | Shaffer et al. |

(Continued)

FOREIGN PATENT DOCUMENTS

| EP | 1233594 A1 | 8/2002 |
| EP | 453270 A1 | 9/2004 |
| EP | 1802055 | 6/2007 |

OTHER PUBLICATIONS

Open Mobile Alliance Ltd.,"Mobile E-mail Requirements Candidate Version 1.0—Oct. 18, 2005," XP002462349,2005 48pp.

(Continued)

*Primary Examiner* — Thai Nguyen
(74) *Attorney, Agent, or Firm* — Novak Druce Connolly Bove + Quigg LLP

(57) ABSTRACT

A method for downloading an attachment to a portable electronic device's attachment viewer includes: sending an initial request from the attachment viewer to a server in response to receiving an email including the attachment by the device; from the server, accessing a graph structure representing a map of the attachment previously built on the server; reconstructing the graph structure in response to the request and encapsulating the graph structure in data having an attachment viewer readable format; (i) downloading successive chunks of the data from the server to the attachment viewer responsive to successive requests; (ii) storing each of the successive chunks on the device prior to display thereof; (iii) displaying the successive chunks on the device and automatically downloading respective next chunks of the data from the server; and (iv) while chunks remain to be downloaded from the server performing (i) to (iii).

14 Claims, 4 Drawing Sheets

(56) References Cited

U.S. PATENT DOCUMENTS

| | | | |
|---|---|---|---|
| 6,385,641 | B1 | 5/2002 | Jiang et al. |
| 6,405,192 | B1 | 6/2002 | Brown et al. |
| 6,442,651 | B2 * | 8/2002 | Crow et al. .................. 711/118 |
| 7,039,678 | B1 | 5/2006 | Halahmi et al. |
| 7,277,419 | B2 | 10/2007 | McGowan |
| 7,409,425 | B2 | 8/2008 | Naick et al. |
| 7,624,160 | B2 * | 11/2009 | Henderson et al. ........... 709/219 |
| 7,796,999 | B1 | 9/2010 | Martin et al. |
| 2002/0161796 | A1 | 10/2002 | Sylthe |
| 2002/0188728 | A1 | 12/2002 | Ballard |
| 2003/0011631 | A1 | 1/2003 | Halahmi |
| 2003/0012161 | A1 | 1/2003 | Cayla et al. |
| 2003/0088580 | A1 | 5/2003 | Desai et al. |
| 2003/0093565 | A1 | 5/2003 | Berger et al. |
| 2004/0098495 | A1 | 5/2004 | Warren et al. |
| 2005/0108363 | A1 | 5/2005 | Torigoe et al. |
| 2005/0108636 | A1 * | 5/2005 | Sylthe et al. .................. 715/525 |
| 2005/0125720 | A1 | 6/2005 | Little et al. |
| 2005/0193068 | A1 | 9/2005 | Brown et al. |
| 2006/0047729 | A1 | 3/2006 | Yuan et al. |
| 2006/0047743 | A1 | 3/2006 | Yuan et al. |
| 2006/0055693 | A1 | 3/2006 | Sylthe et al. |
| 2006/0103665 | A1 | 5/2006 | Opaia et al. |
| 2006/0265510 | A1 | 11/2006 | Warren et al. |
| 2007/0091789 | A1 | 4/2007 | Thukral |
| 2007/0143421 | A1 | 6/2007 | Vuong et al. |
| 2008/0039051 | A1 * | 2/2008 | Stalin et al. ................ 455/412.1 |

OTHER PUBLICATIONS

Research in Motion Limited, "Attachment Service," XP-002462350,2003,10 pp.

Liljeberg M, et al. Moegli www.software: Improved usability of www.in mobile wan environments, :Global Telecommunications conference, Nov. 1996, pp. 33-37.

Summons to attend oral proceedings mailed Jan. 21, 2010. In corresponding application No. 07113981.0.

Extended European Search Report mailed Jan. 14, 2008. In corresponding application No. 07113981.0.

Luis Lopes, "UMTS Bearer Performance in The Presence of The Synchronisation Channel", IEEE, 2002, pp. 1-2.

* cited by examiner

METHOD FOR PRE-FETCHING DATA CHUNKS OF AN EMAIL ATTACHMENT ON A PORTABLE ELECTRONIC DEVICE

CROSS REFERENCE TO RELATED APPLICATION

This application is a continuation of U.S. application Ser. No. 11/835,595, filed Aug. 8, 2007, the entire contents of which is incorporated herein by reference.

FIELD

The present disclosure relates to portable electronic devices operating on wireless networks, in particular, to a method for receiving email attachments.

BACKGROUND

It is becoming increasingly popular to send photographs, scanned documents, slide shows, PDF documents and other types of attachments in email messages. Each attachment is provided with a filename and is linked to an email message in a manner that is well known in the art. Often, a single email message may contain multiple attachments.

On portable electronic devices, there is generally a delay between a request to view an attachment by a user and display of the attachment on the display screen of the device. The primary cause of the delay is server processing time, however, network speed is also a contributing factor. The delay can often exceed 20-30 seconds. A shorter waiting period between requesting and viewing an attachment on a portable electronic device is therefore desirable.

One solution to the foregoing is to send an initial data request from the attachment viewer to a server in response to receipt of an email message including the attachment by the portable electronic device, accessing a graph structure representing a map of the attachment from the server, the graph structure having been previously built on the server, reconstructing the graph structure in response to the initial request and encapsulating the graph structure in data having an attachment viewer readable format, the data being stored on the server and sending an initial chunk of the data to the attachment viewer, the initial chunk of the data being stored on the portable electronic device; wherein the initial chunk of the data is received prior to a request to view the attachment being sent to the server.

Since the attachment data is divided into multiple chunks, whenever the user scrolls through the document and reaches a certain character count threshold (before the end of the latest downloaded data chunk), a request for the next available chunk is issued by the attachment viewer to the attachment server. However, the foregoing method pre-fetches only the initial chunk of data and, due to the size of such data chunks and the complexity of processing the data chunks within the attachment server side, the user continues to wait several seconds before the next chunk data is available for viewing.

BRIEF DESCRIPTION OF THE DRAWINGS

The embodiments will be better understood with reference to the following Figures in which like numerals denote like parts and in which.

DETAILED DESCRIPTION

In one aspect there is provided a method for downloading an attachment to an attachment viewer of a portable electronic device, comprising: sending an initial request from the attachment viewer to a server in response to receipt of an email message identifying the attachment by the portable electronic device; accessing a graph structure representing a map of the attachment from the server, the graph structure having been previously built on the server; reconstructing the graph structure in response to the initial request and encapsulating the graph structure in data having an attachment viewer readable format, the data being stored on the server; downloading an initial chunk of the data from the server to the attachment viewer responsive to the initial request; storing the downloaded chunk of the data on the portable electronic device prior to display thereof; displaying the stored chunk of the data on the portable electronic device; upon displaying the stored chunk of the data, automatically sending a request to download a respective next chunk of the data from the server; responsive to the request, downloading the respective next chunk of the data from the server; and while data chunks of the data remain to be downloaded from the server, repeating the storing, displaying, requesting and downloading.

In another aspect there is provided a portable electronic device including: at least one input device; a content store; a display; and an attachment viewer for: sending an initial request to download an initial chunk of data from a server storing the data in an attachment viewer readable format; receiving and storing the downloaded chunk of the data in the content store prior to display thereof; displaying the stored chunk of the data on the display; upon displaying the stored chunk of the data, automatically sending a request to download a respective next chunk of the data from the server; and while the data chunks of the data remain to be downloaded from the server, repeating the receiving, storing, displaying and requesting.

In yet another aspect there is provided a method for downloading data onto a portable electronic device having an attachment viewer, a display and a content store, comprising: sending an initial request from the attachment viewer to download an initial chunk of data from a server storing the data in an attachment viewer readable format; receiving and storing the downloaded chunk of the data in the content store prior to display thereof; displaying the stored chunk of the data on the display; upon displaying the stored chunk of the data, automatically sending a request from the attachment viewer to download a respective next chunk of the data from the server; and while the data chunks of the data remain to be downloaded from the server, repeating the receiving, storing, displaying and requesting.

Figure 1:
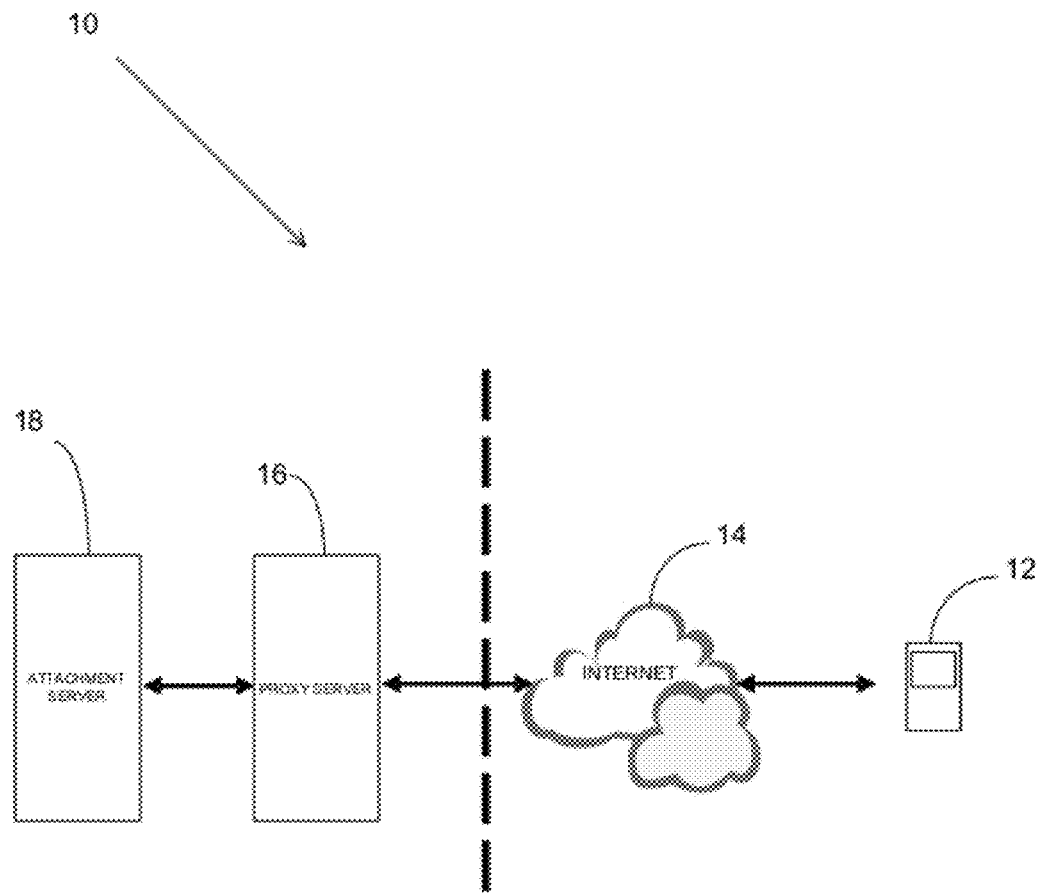
FIG. 1 is a schematic diagram of a wireless communication system.

Referring now to FIG. 1, a communication system 10 for a portable electronic device 12 is generally shown. The portable electronic device 12 is operable to effect communications over a radio communications channel and communicates with a base station (not shown) while located within a coverage area that is defined by the base station. The base station is part of a wireless network that is in communication with the Internet 14. Data is delivered to the portable electronic device 12 via wireless transmission from the base station. Similarly, data is sent from the portable electronic device 12 via wireless transmission to the base station.

It will be appreciated that the portable electronic device 12 is movable within the coverage area and can be moved to coverage areas defined by other base stations. Further, as will be understood by one of ordinary skill in the art, wireless networks include GSM/GPRS, CDPD, TDMA, iDEN, Mobitex, DataTAC networks, EDGE, EVDO or UMTS and broadband networks such as Bluetooth and variants of 802.11.

A server 18 handles wireless client requests from the portable electronic device 12. A firewall, or proxy server, 16, is provided between the server 18 and the Internet 14. The server 18 further operates as an Attachment Server, which communicates with an email client and an Attachment Viewer of the portable electronic device 12 to allow a user to view attachments that are received in email messages. While only one server 18 is shown for illustration purposes, a person skilled in the art will understand that the Attachment Server may alternatively be a separate server.

Figure 2:
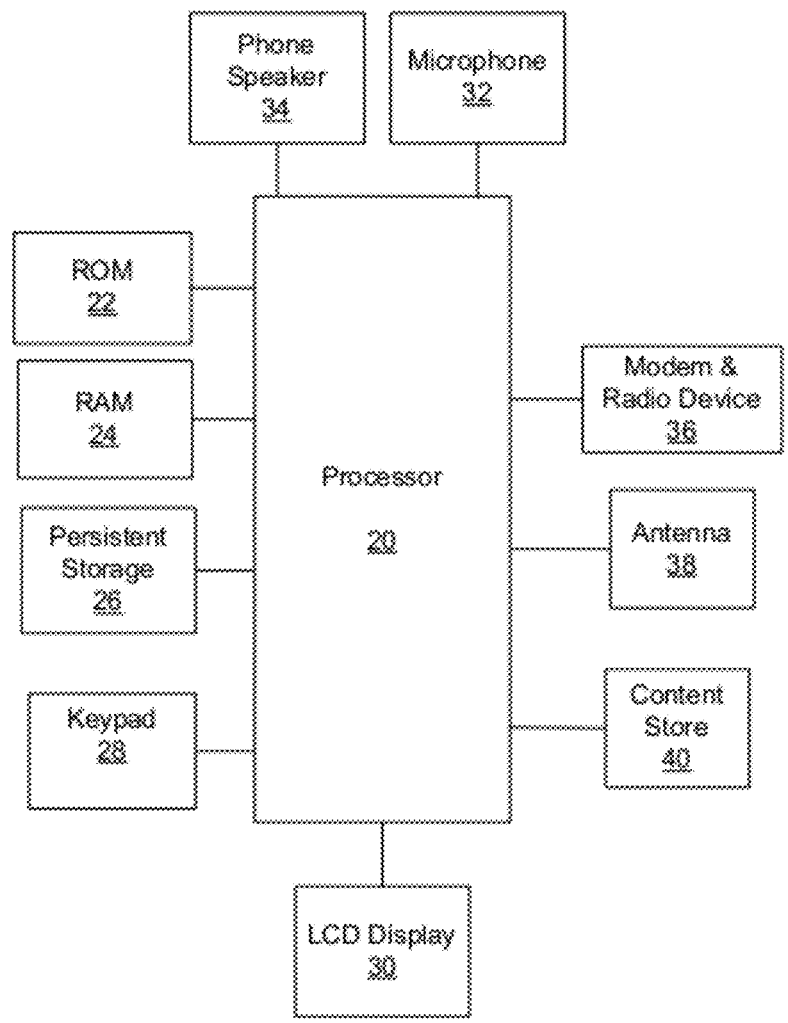
FIG. 2 is a block diagram of components of a portable electronic device according to an embodiment.

Referring now to FIG. 2, a block diagram of certain components within the portable electronic device 12 is shown. In the present embodiment, the portable electronic device 12 is based on the computing environment and functionality of a wireless personal digital assistant (PDA). It will be understood, however, that the portable electronic device 12 is not limited to wireless personal digital assistants. Other portable electronic devices are possible, such as smart telephones, and laptop computers.

The portable electronic device 12 is based on a microcomputer including a processor 20 connected to a read-only-memory (ROM) 22 that contains a plurality of applications executable by the processor 20 that enables each portable electronic device 12 to perform certain functions including, for example, PIN message functions, SMS message functions and cellular telephone functions, including an Attachment Viewer application for viewing attachments to emails, such as word processing documents, spreadsheets, images, etc. The processor 20 is also connected to a random access memory unit (RAM) 24 and a persistent storage device 26 which are responsible for various non-volatile storage functions of the portable electronic device 12. The processor 20 receives input from various input devices including a keypad 28. The processor 20 outputs to various output devices including an LCD display 30. A microphone 32 and phone speaker 34 are connected to the processor 20 for cellular telephone functions. The processor 20 is also connected to a modem and radio device 36. The modem and radio device 36 is used to connect to wireless networks and transmit and receive voice and data communications through an antenna 38. A content store 40, which is generally a file storage system for the portable electronic device 12, is also provided.

Request/view functionality for an attachment of an email message received by the portable electronic device 12 is provided by the Attachment Viewer and the Attachment Server 18.

Figure 3:
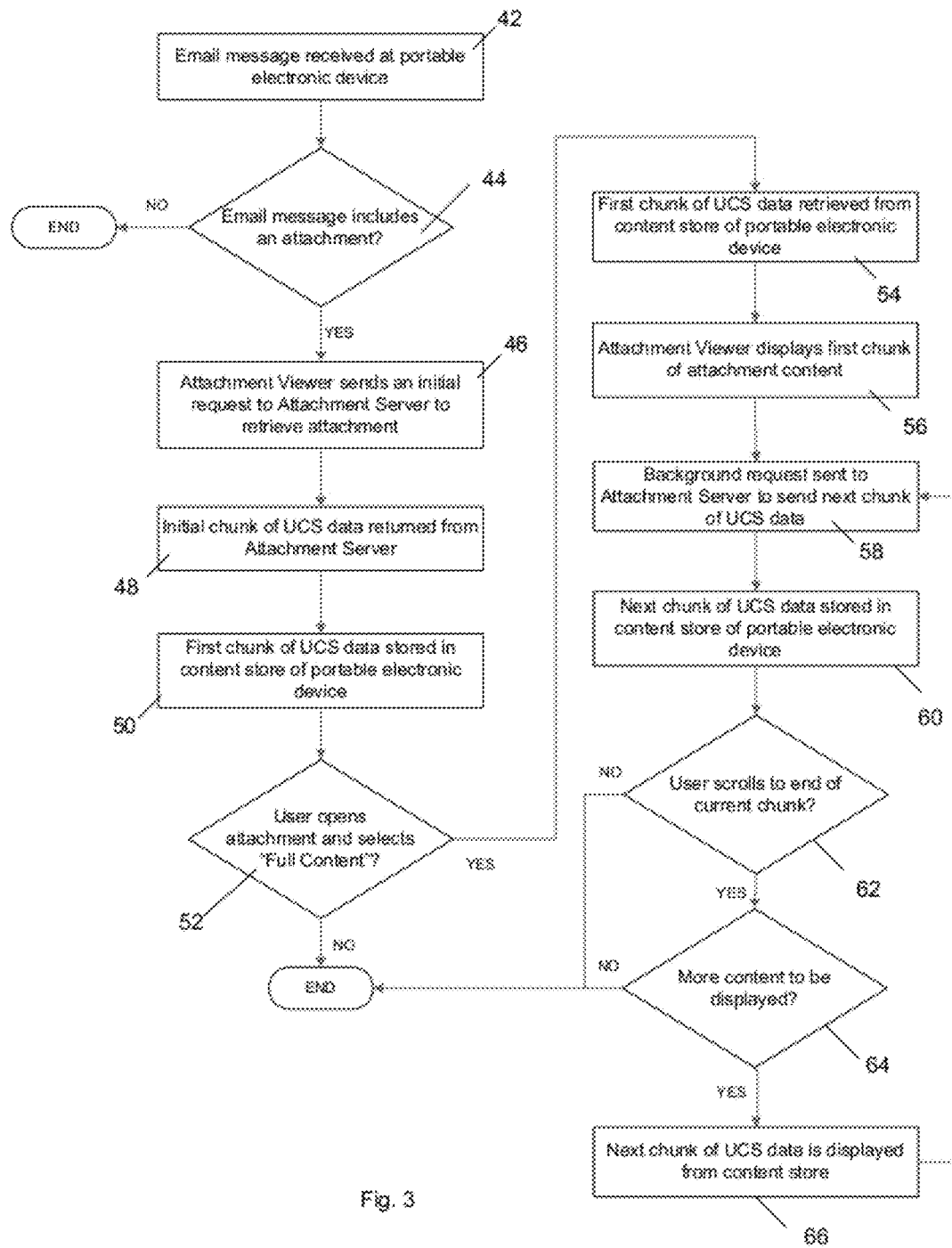
FIG. 3 is a flowchart showing device-side operation of a method for downloading data to an Attachment Viewer of the portable electronic device of FIG. 2.

Referring to FIG. 3, device-side operation of a method for downloading an attachment to an Attachment Viewer of the portable electronic device 12 is generally shown. When an email message is received by the portable electronic device 12 at step 42, the Attachment Viewer first determines whether or not the email message contains an attachment, as indicated at step 44. The Attachment Viewer is able to determine if an attachment is present by checking the email payload and searching for email components that have been marked as supported attachments. The email components are marked by an enterprise server, which communicates with Attachment Server 18.

If the email message does not include an attachment, the logic terminates. If the email message does include an attachment, the Attachment Viewer sends an initial request to the Attachment Server 18 to retrieve the attachment, as indicated at step 46. In response to the initial request, an initial chunk of data is returned to the portable electronic device 12 and is stored in the content store 40, as indicated at steps 48 and 50, respectively. Each chunk of data downloaded from the Attachment Server 18 is of a size (e.g. 16 Kbyte) suitable for internal caching within the device 12 and may be provided in Universal Content Stream (UCS) format, which is an Attachment Viewer readable format.

At step 52, the user opens the attachment and selects "Full Content" from a menu in order to view the attachment in the Attachment Viewer of the portable electronic device 12. If the user does not choose to view the attachment, the logic terminates and the initial chunk of UCS data remains in the content store 40 of the portable electronic device 12 until the email message is deleted.

In response to the "Full Content" selection by the user, the initial chunk of UCS data is retrieved from the content store 40 and displayed by the Attachment Viewer, as indicated at steps 54 and 56, respectively. Upon the initial document display of the first data chunk, a background request for the second chunk is immediately issued (step 58) and data is cached (step 60). When the user action requests this data (i.e. by scrolling to the end of the first chunk), the next chunk is immediately retrieved form the persistent store 40 and presented to the user at step 66. Provided that additional attachment data remains to be downloaded from the server 18 (step 64), the background request for the subsequent next data chunk is re-issued (step 58).

It will be understood from the foregoing that each next data chunk is automatically downloaded from the server 18 and cached on the device 12 immediately upon user action (scroll) requesting the current data chunk. It will also be understood that if the user jumps in the document text such as by using a text hyperlink (a "NO" at step 62), then the chunk requested at step 58 will not necessarily be the subsequent chunk of data to be displayed. Since such a "jump" is not an implied action that can be predicted, the method terminates and the user has to wait for the target data chunk to be downloaded from the server 18. However, once displayed, the method starts again at step 58 by pre-fetching the next chunk after the target chunk being displayed.

Figure 4:
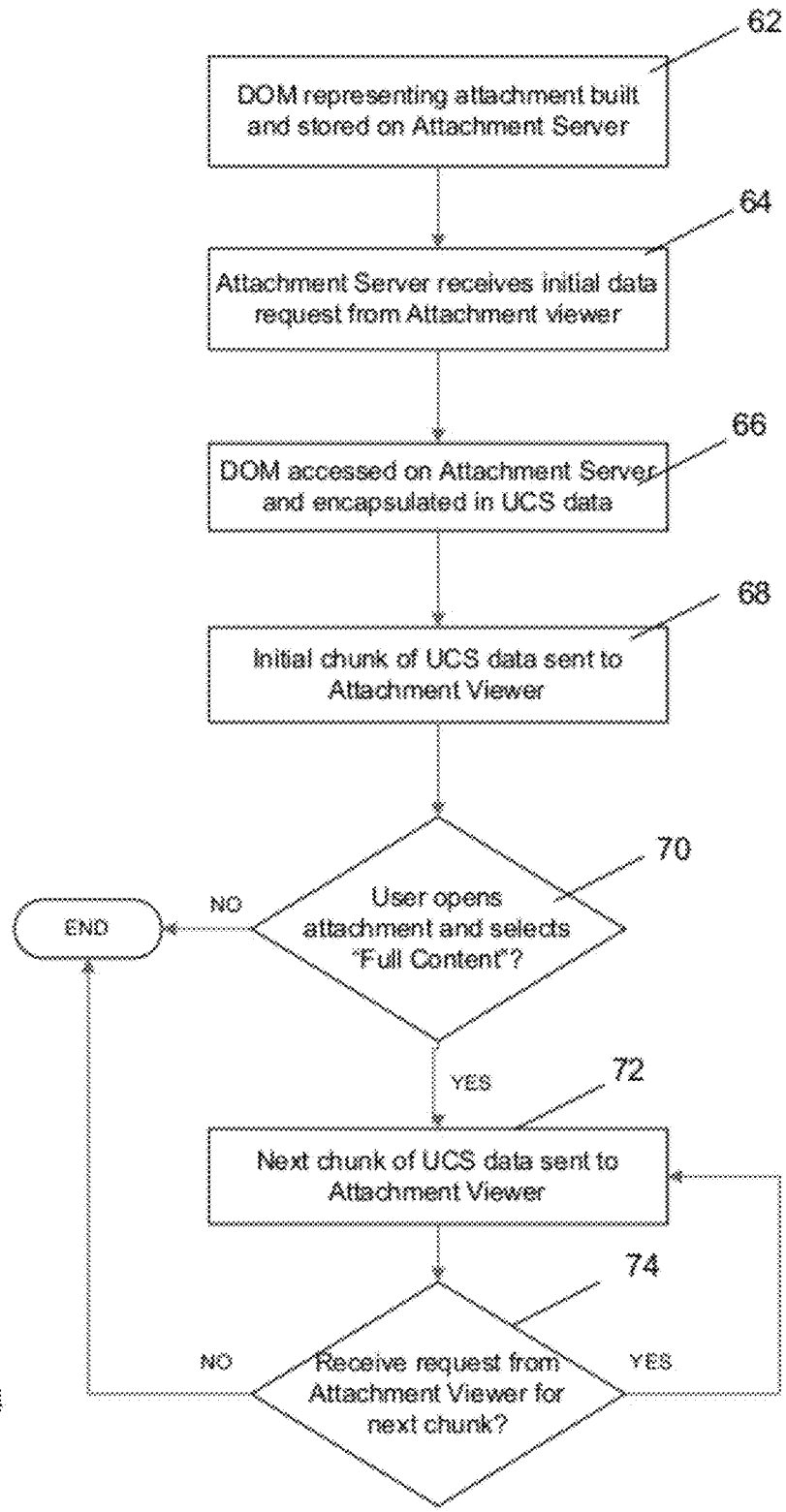
FIG. 4 is a flowchart showing server-side operation of a method for downloading data to an Attachment Viewer of the portable electronic device of FIG. 2.

Referring to FIG. 4, server-side operation of the method for downloading an attachment to an Attachment Viewer of the portable electronic device 12 is generally shown. When an email message having an attachment is received by the portable electronic device 12, as indicated at step 42 of FIG. 3, the Attachment Server 18 first builds a Document Object Model (DOM) by parsing the attachment document, as indicated at step 62 of FIG. 4. In this manner, a graph structure representing a map of the original attachment file is built within the Attachment Server 18. The DOM contains textual content, font, style and formatting attributes as well as layout attributes, such as page/slide size, positioning information (i.e. x, y and z coordinates on the page), embedded graphics and tables, for example. DOM structure is well known and is disclosed in United States Patent Application Nos. 2002/0161796 and 2006/0055693, which are herein incorporated by reference.

At step 64, which corresponds to step 46 of FIG. 3, the initial request from the Attachment Viewer is received by the Attachment Server 18. Based on the request content, the DOM is accessed and components of the DOM are reconstructed in order to fulfill the request. The request typically includes: a screen size of the portable electronic device 12, the type of portable electronic device 12 and the requested UCS chunk size in Kilobytes. At step 66, the reconstructed DOM is encapsulated in UCS data and stored on the Attachment Server 18. An initial chunk of UCS data is then sent to the Attachment Viewer, as indicated at step 68, which corresponds to step 48 of FIG. 3. The initial chunk of data contains the start of the attachment. For example, the first chunk may contain the first page or multiple pages of a document depending on how many pages can fit in the requested UCS chunk size. When the user opens the attachment and selects "Full Content", as indicated at step 70, the second chunk of UCS data is sent to the portable electronic device 12, as indicated at step 72. Then, when the user scrolls to the end of the first chunk, the next chunk is already available in content store 40. As soon as the next chunk is displayed (corresponding to step 66 in FIG. 3), the attachment viewer sends a request for the next chunk (step 58 in FIG. 3), resulting in the Attachment Server 18 downloading the next data chunk (step 74).

In summary, by automatically pre-fetching and storing each next (subsequent) chunk of attachment data locally on the portable electronic device 12, the Attachment Viewer is able to display attachment content immediately upon user scrolling to the end of a current chunk of data. By the time the user has viewed each portion of the attachment defined by a chunk of data, which is contained in the initial chunk of data, the second chunk of data will have arrived at the device 12. Thus, the user is able to view the attachment document without experiencing a significant delay following the view request.

The method for downloading data to a portable electronic device 12 is not limited to downloading attachment data from an Attachment Server. Native attachment downloads, which send attachment binary data from an Enterprise Server rather than UCS data from the Attachment Server, may also be performed. Native attachment download is useful for portable electronic devices having Microsoft Office™-type programs available. Such programs are capable of displaying .doc and .ppt files, for example, using the appropriate Office-type program on the portable electronic device. Other types of data may also be downloaded using the method disclosed herein.

A specific embodiment has been shown and described herein. However, modifications and variations may occur to those skilled in the art. All such modifications and variations are believed to be within the sphere and scope of the present embodiment.

What is claimed is:

1. A method for downloading an attachment to an attachment viewer of a portable electronic device, comprising:
sending an initial request from said attachment viewer to a server in response to receipt of an email message identifying said attachment by said portable electronic device;
accessing a Document Object Model graph structure representing a map of said attachment from said server, said Document Object Model graph structure having been previously built on said server;
reconstructing said Document Object Model graph structure in response to said initial request and encapsulating said Document Object Model graph structure in data having an attachment viewer readable format, said data being stored on said server;
downloading an initial chunk of said data from said server to said attachment viewer responsive to said initial request;
storing said downloaded initial chunk of said data on said portable electronic device prior to display thereof;
displaying said stored initial chunk of said data on said portable electronic device; upon displaying said stored initial chunk of said data, detecting scrolling towards an end of the initial chunk of said data and automatically sending a request to download a respective next chunk of said data from said server;
responsive to said request, downloading said respective next chunk of said data from said server; and
while data chunks of said data remain to be downloaded from said server, repeating said storing, displaying, requesting and downloading for subsequent chunks of said data.

2. The method as claimed in claim 1, wherein said attachment viewer readable format is Universal Content Stream format.

3. The method as claimed in claim 1, wherein said sending and said downloading are conducted over a wireless network selected from the group consisting of GSM/GPRS, CDPD, TDMA, iDEN, Mobitex, and DataTAC, EDGE, EVDO, UMTS, Bluetooth and variants of 802.11.

4. The method as claimed in claim 1, further comprising: prior to displaying said stored subsequent chunk of said data, detecting scrolling of a currently displayed chunk of said data.

5. A portable electronic device, including:
at least one input device;
a content store;
a display; and
a memory storing instructions for an attachment viewer executable by a processor for:
sending an initial request to download an initial chunk of data having a requested size from a server storing said data in an attachment viewer readable Universal Content Stream format based on Document Object Model graph structure;
receiving and storing said downloaded initial chunk of said data having the requested size in Universal Content Stream format in said content store prior to display thereof;
displaying said stored initial chunk of said data on said display;
upon displaying said stored initial chunk of said data, detecting scrolling towards an end of the initial chunk of said data and automatically sending a request to download a respective next chunk of said data from said server; and
while said data chunks of said data remain to be downloaded from said server, repeating said receiving, storing, displaying and requesting for subsequent chunks of said data having the requested size.

6. The portable electronic device as claimed in claim 5, wherein said sending and said downloading are conducted over a wireless network selected from the group consisting of GSM/GPRS, CDPD, TDMA, iDEN, Mobitex, and DataTAC, EDGE, EVDO, UMTS, Bluetooth and variants of 802.11.

7. The portable electronic device as claimed in claim 5, said attachment viewer further for detecting scrolling of a currently displayed chunk of said data prior to displaying said stored subsequent chunk of said data.

8. A method for downloading data onto a portable electronic device having an attachment viewer, a display and a content store, comprising:
sending an initial request from said attachment viewer to download an initial chunk of data having a requested size from a server storing said data in attachment viewer readable Universal Content Stream format based on Document Object Model graph structure;

receiving and storing said downloaded initial chunk of said data having the requested size in Universal Content Stream format in said content store prior to display thereof;

displaying said stored initial chunk of said data on said display;

upon displaying said stored initial chunk of said data, detecting scrolling towards an end of the initial chunk of said data and automatically sending a request from said attachment viewer to download a respective next chunk of said data from said server;

and while said data chunks of said data remain to be downloaded from said server, repeating said receiving, storing, displaying and requesting for the subsequent chunks of said data having the requested size.

9. The method as claimed in claim 8, wherein said data is an attachment that is received in an email message.

10. The method as claimed in claim 8, wherein said sending and said receiving are conducted over a wireless network selected from the group consisting of GSM/GPRS, CDPD, TDMA, iDEN, Mobitex, and DataTAC, EDGE, EVDO, UMTS, Bluetooth and variants of 802.11.

11. The method as claimed in claim 8, further comprising: prior to displaying said stored subsequent chunk of said data, detecting scrolling of a currently displayed chunk of said data.

12. A system, comprising:

a portable electronic device having at least one input device, a content store, a display and an attachment viewer; said attachment viewer for:

sending an initial request to download an initial chunk of data from a server storing said data in an attachment viewer readable format;

receiving and storing said downloaded initial chunk of said data in said content store prior to display thereof;

displaying said stored initial chunk of said data on said display;

upon displaying said stored initial chunk of said data, automatically sending a request to download a respective next chunk of said data from said server; and while said data chunks of said data remain to be downloaded from said server, repeating said receiving, storing, displaying and requesting for subsequent chunks of said data; and a server configured, in response to said initial request, to access a Document Object Model graph structure representing a map of said attachment from said server, said Document Object Model graph structure having been previously built on said server; to reconstruct said Document Object Model graph structure, encapsulate said graph structure in data having an attachment viewer readable format; store said data;

and to transmit an initial chunk of said data; said server further configured to transmit respective next chunks of said data in response to subsequent requests.

13. A non-transitory computer readable storage medium storing a plurality of computer readable instructions executable by a processor to perform a method for downloading data onto a portable electronic device having an attachment viewer, a display and a content store, the method comprising:

sending an initial request from said attachment viewer to download an initial chunk of data having a requested size from a server storing said data in an attachment viewer readable Universal Content Stream format based on Document Object Model graph structure;

receiving and storing said downloaded initial chunk of said data having the requested size in Universal Content Stream format in said content store prior to display thereof;

displaying said stored initial chunk of said data on said display;

upon displaying said stored initial chunk of said data, detecting scrolling towards an end of the initial chunk of said data and automatically sending a request from said attachment viewer to download a respective next chunk of said data from said server; and while said data chunks of said data remain to be downloaded from said server, repeating said receiving, storing, displaying and requesting for subsequent chunks of said data having a requested size.

14. The non-transitory computer readable storage medium of claim 13, the method further comprising: prior to displaying said stored subsequent chunk of said data, detecting scrolling of a currently displayed chunk of said data.

* * * * *